(No Model.)  5 Sheets—Sheet 1.

S. E., J. & W. W. MORRAL.
CORN HUSKING MACHINE.

No. 484,808.  Patented Oct. 25, 1892.

Attest.
O. E. Converse
R. J. Converse

Inventors.
Samuel E. Morral
John Morral
William W. Morral
By B. C. Converse, Atty

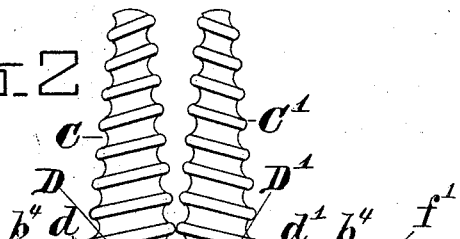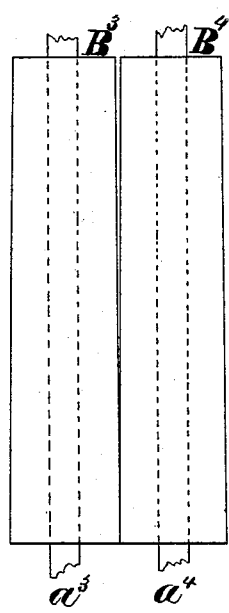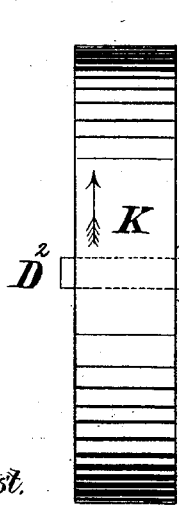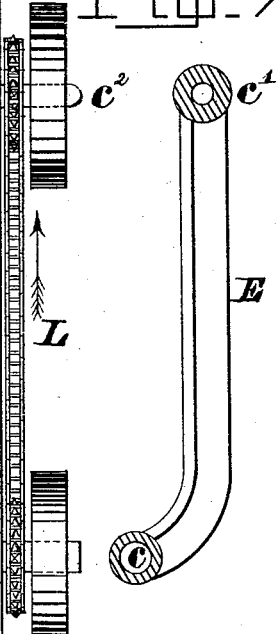

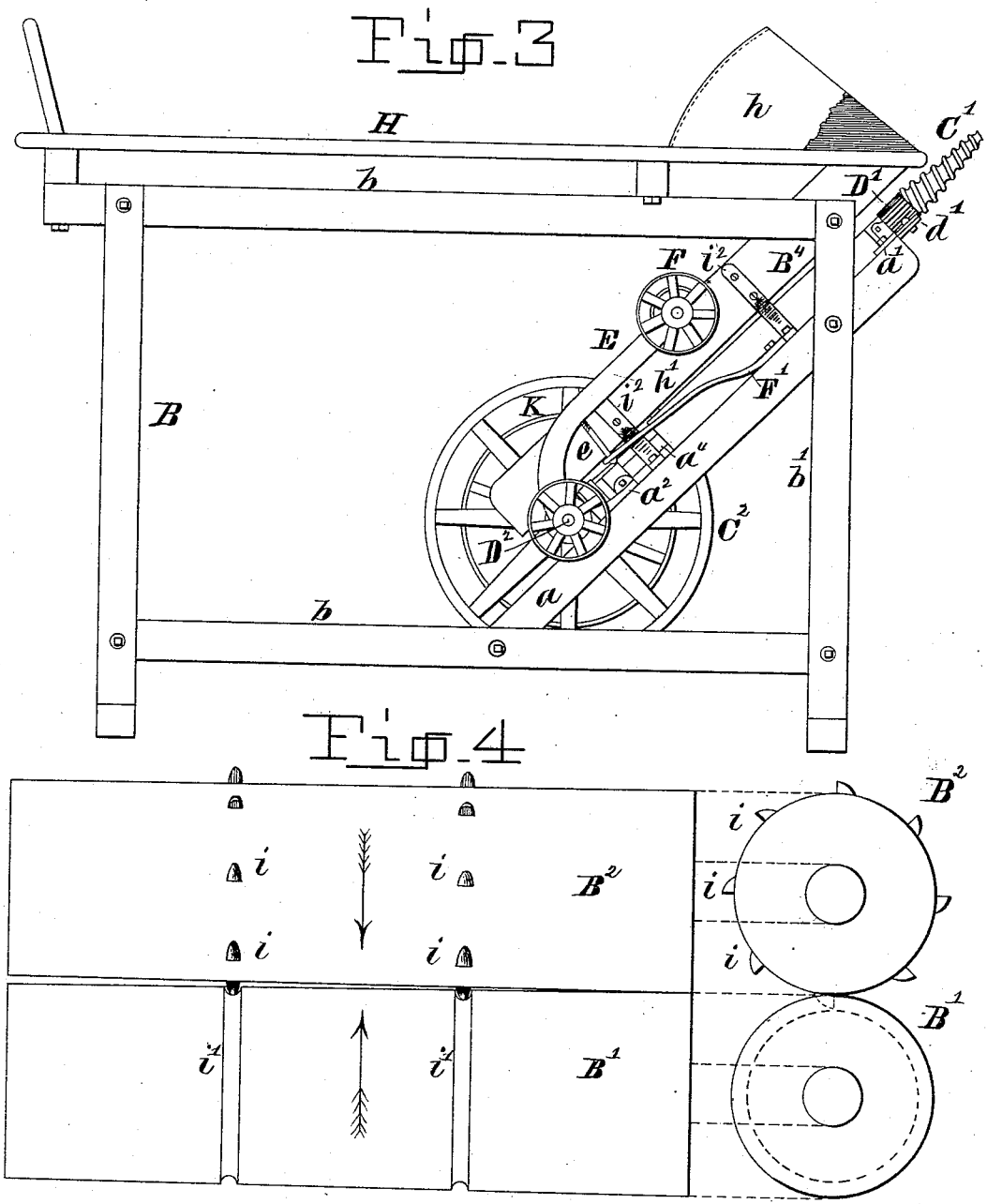

(No Model.) 5 Sheets—Sheet 4.
S. E., J. & W. W. MORRAL.
CORN HUSKING MACHINE.
No. 484,808. Patented Oct. 25, 1892.
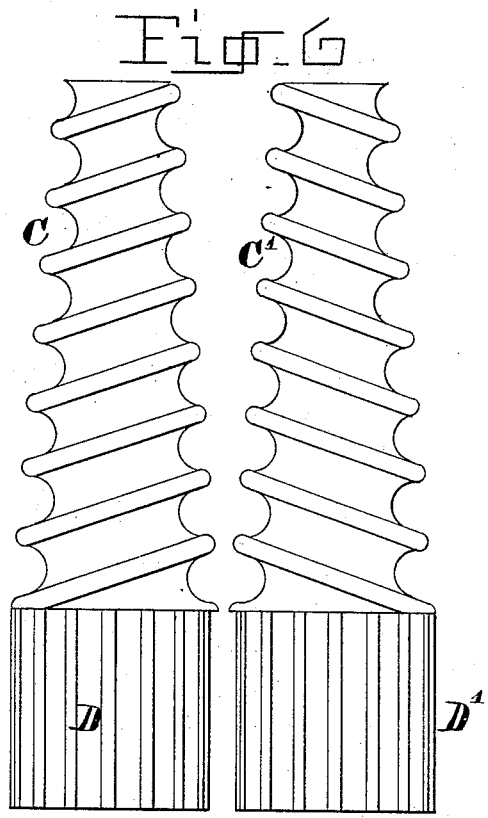
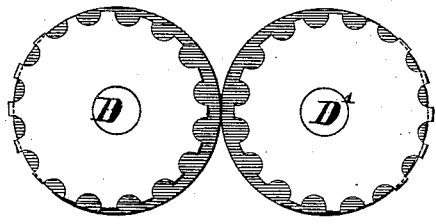
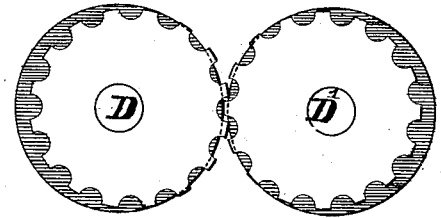
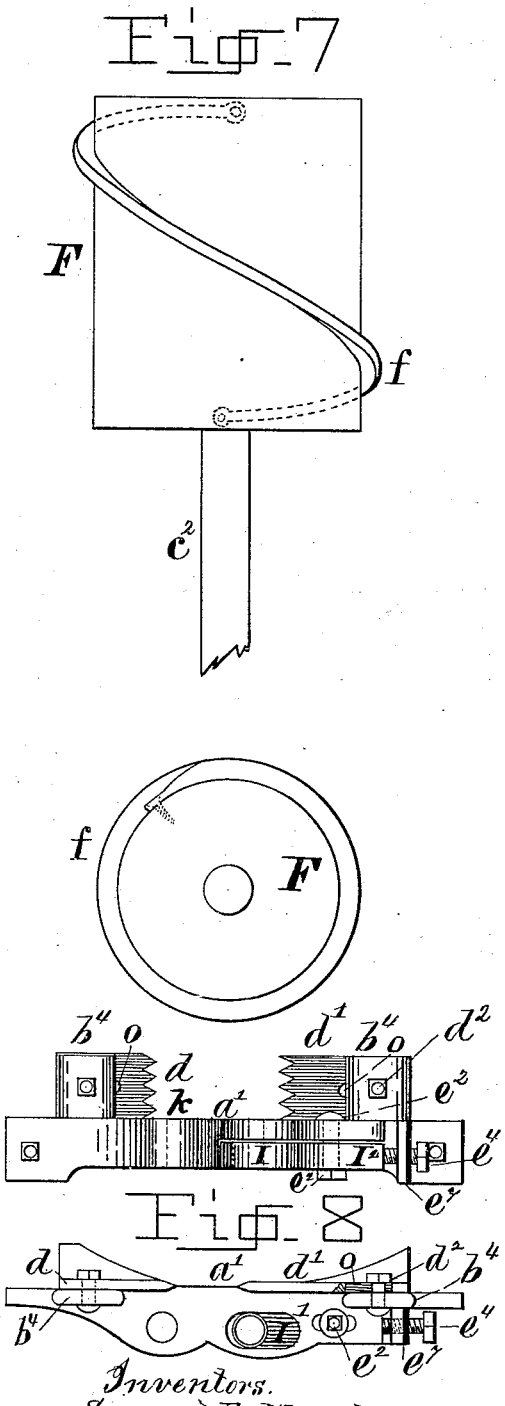
Attest.
O. E. Converse
R. J. Converse
Inventors.
Samuel E. Morral
John Morral
William W. Morral
By B. C. Converse, Atty.

(No Model.) 5 Sheets—Sheet 5.

S. E., J. & W. W. MORRAL.
CORN HUSKING MACHINE.

No. 484,808. Patented Oct. 25, 1892.

Attest.
Ora E. Converse
R. J. Converse

Inventors.
Samuel E. Morral
John Morral
William W. Morral
By B. C. Converse, Atty.

UNITED STATES PATENT OFFICE.

SAMUEL E. MORRAL, JOHN MORRAL, AND WILLIAM W. MORRAL, OF MORRAL, OHIO.

CORN-HUSKING MACHINE.

SPECIFICATION forming part of Letters Patent No. 484,808, dated October 25, 1892.

Application filed June 1, 1892. Serial No. 435,213. (No model.)

*To all whom it may concern:*

Be it known that we, SAMUEL E. MORRAL, JOHN MORRAL, and WILLIAM W. MORRAL, citizens of the United States, residing at Morral, in the county of Marion and State of Ohio, have invented certain new and useful Improvements in Corn-Husking Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in machines for husking corn, as fully described in the specification and more particularly pointed out in the claims. It belongs to that class of corn-husking machines in which the ear is husked after being jerked from the stalk and also directly from the latter.

Figure 1:
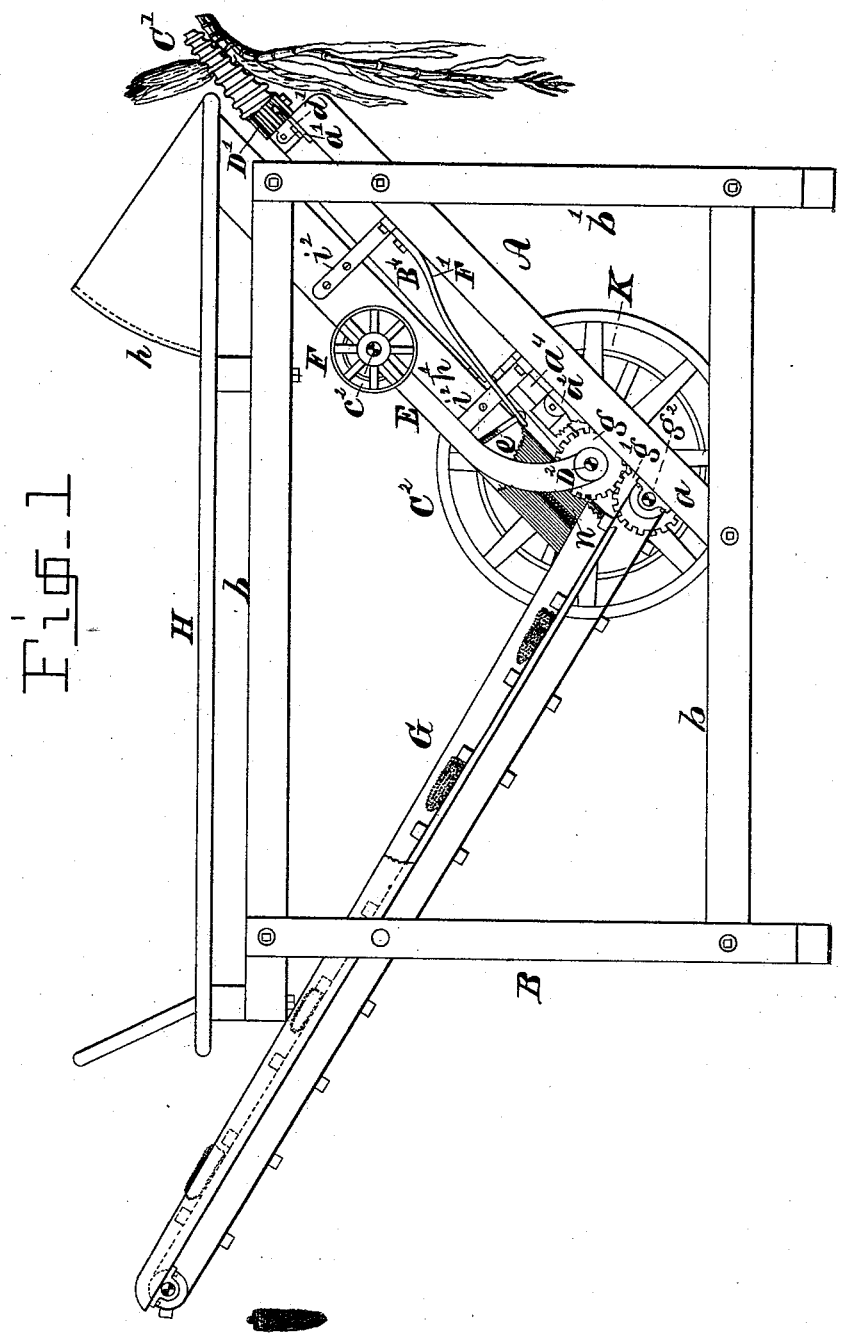
Figure 10:
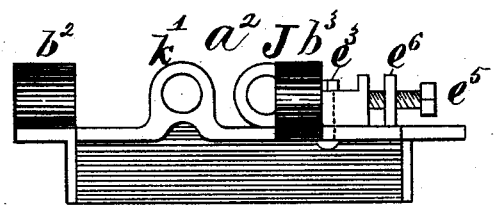
Figure 12:
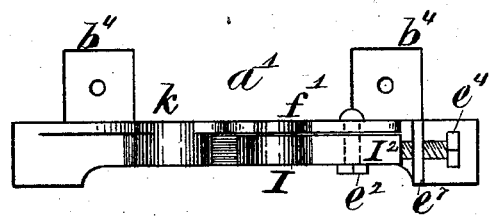
Figure 11:
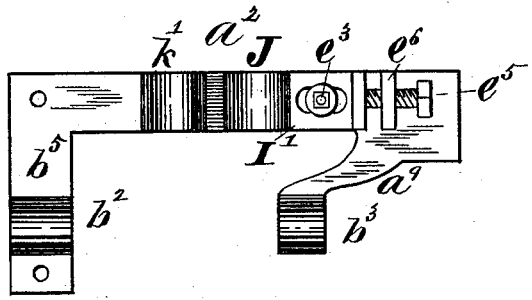
Figure 13:
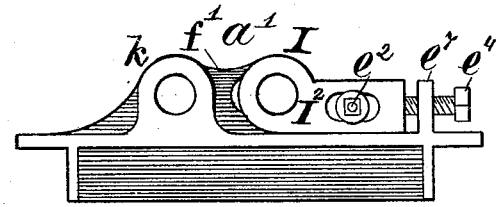

Figure 1 is a side elevation of a corn-husking machine having our improvements embodied therein. In this view an elevator is also shown, parts of the machine being broken out to show the gearing connecting it with that of the latter. Fig. 2 is a top view of the machine with the table and the elevator and the outside frame removed, this view being from a point of sight point-blank or at right angles to the plane of the inclined rolls. Fig. 3 is a side elevation of the machine without the elevator. Fig. 4 shows side and end sections of the inclined rolls used for operating upon dry corn similar, or nearly so, to those shown in Fig. 2. Fig. 5, Sheet 2, shows plan views of the plain rubber rolls which are used for operating upon green corn. These rolls are also shown in the views, Figs. 1 and 3. Fig. 6 shows enlarged plan views of the tapering spiral worms and the toothed eccentrics; also, two views showing the varying positions of the latter. Fig. 7 shows plan and end views of the spiral flanged transverse roller seen in its operative position in Fig. 2. Fig. 8 represents top and front views of the upper frame-plate with the flat serrated plates, the front view showing the frame-plate reversed to show the means for adjusting the serrated plates. Fig. 9, Sheet 2, is a detail showing a view of the bracket which supports the shaft of the transverse roller and which is pivoted by its lower end to the shaft of the main drive-pulley. Fig. 10 is an elevation of the lower frame-plate as viewed from the rear side. Fig. 11 is a top view of the same. Fig. 12 is a top view of the upper frame-plate. Fig. 13 is an elevation of the same as viewed from the lower or rear side.

In the drawings, A is the inside frame of the machine. This consists of two inclined rails $a\ a$, having an angle of about forty-five degrees and extending from points near the middle of the two lower horizontal rails $b\ b$ of the outer frame B upward and forward beyond the two front posts $b'\ b'$ and secured at each end by bolts and nuts to the lower rails and front posts, respectively, (of frame B.) The upper ends of the inclined rails $a\ a$ are connected by a long cast-iron frame-plate $a'$, having thereon two boxes $k$ and I, and the rectangular cast-iron plate $a^2$ connects the two inclined rails $a\ a$ near their lower ends and has, also, a pair of boxes $k'$ and J thereon in line with the upper boxes $k$ and I. These boxes support the journals of two long inclined parallel shafts $a^3$ and $a^4$, on which are mounted the two long and slightly-tapering rolls B' and B², as seen in Fig. 2. The upper ends of shafts $a^3$ and $a^4$ project beyond the upper frame bearing-plate $a'$ and are armed with a pair of tapering spiral worms or screws C C', which have their threads pitched in opposite directions, (right and left,) and as the shafts $a^3$ and $a^4$ rotate toward each other substances inserted between these spiral worms will be carried downwardly upon the approximating surfaces of the rolls B' and B².

Between the spirals C C' and the plate $a'$ (on the same shafts) a pair of toothed or corrugated eccentrics D D' are mounted, having the grooves which lie between their teeth cut longitudinally. Beneath these eccentrics and extending inwardly toward the dividing-line of the latter is a pair of serrated or toothed plates $d$ and $d'$. These plates are flat and oblong and are bolted to the under side of the two forwardly-projecting lugs $b^4\ b^4$ at either end of the frame-plate $a'$. The teeth of these serrated plates are in close proximity to the faces of the eccentrics, and they serve to free the latter from accumulations of husks and silk in the operation of the machine.

Rolls B' and B², used for husking dry corn, are preferably made of cast-iron and extend from plate $a'$ down to a point a little distance above the lower plate $a^2$, from which point a sheet-iron spout $n$ conducts the ears of corn to the belt of the elevator G, as seen in Fig. 1. One of these rolls B' has circumferential grooves $i'\ i'$ cut in its surface, which grooves are engaged by the pins $i\ i$, set in rows on the fellow roll B². These grooves allow of the adjustment of the latter roll to any degree of proximity with roll B' in operating to effect the best results. Shafts $a^3$ and $a^4$ extend below the frame-plate $a^2$ and have a pair of engaging spur-gears $a^5$ and $a^6$ thereon, and the former shaft $a^3$, being in stationary bearings, is longer than the latter $a^4$, and has on its lower end (below the spur-gear) a bevel-wheel $a^8$, which is engaged by the driving bevel-pinion $a^7$ on the middle of the main driving-shaft D². This shaft is supported in boxes $b^2$ and $b^3$ on the ends of the two arms $b^5$ and $a^9$, extending rearward from the horizontal part of the frame-plate $a^2$. Arm $b^5$ extends at right angles and has a box $b^2$ on it, and arm $a^9$ curves inward toward the left, as seen in Figs. 2 and 11, and terminates in box $b^3$, which latter supports the shaft D² in close proximity to the bevel-pinion $a^7$, where the deflective strain is greatest upon the shaft from the engagement of the latter pinion with the bevel-wheel $a^8$.

Pivoted upon the main shaft D² on the right of box $b^3$ is a sleeve $c$, extending at right angles from the lower end of the long cast-iron bracket E. (Seen in detail in Fig. 9.) This bracket extends longitudinally over the right frame-rail $a$ and has the rear end of its body part curved downwardly to the sleeve $c$. On its forward end is a like laterally-extending sleeve $c'$, carrying within it the transverse rotating shaft $c^2$ of the heavy short roller F over the dividing-line of rollers B' and B², and having on it a projecting spiral flange $f$, extending from one end around it to the other. This roller is preferably made of wood and has its flange of iron fastened thereon with screws or bolts, as seen in the details in dotted lines, Fig. 7. Roller F is operated by sprocket-wheels and a chain L, connecting them on shafts D² and $c^2$. Belt-pulleys are also shown on the ends of the same shafts, so that a belt can be used, if preferred.

Near box $b^2$ on shaft D², Fig. 2, is a spur-gear $g$ (shown, also, in Fig. 1) in engagement with spur-gear $g'$ on shaft $g^2$, which latter shaft extends across rails $a\ a$ below shaft D² and drives the elevator G, as seen in connection with the machine in the last-named figure.

A balance-wheel C² and a large driving-pulley K on the left end of the main shaft D² show means for transmitting power to the machine.

Under the pivoted bracket E and in line therewith is a long bar-spring F', bolted through its upper or forward end to rail $a$ near the upper side-board brace $i^2$. This spring is bent upward from near its fixed end and extends rearward beyond the lower brace $i^2$, and has a screw-bolt $e$, extending up through it into the bracket, by which bolt the relative distance for roller F above the rolls B' and B² is obtained and the proper adjustment effected. The pins in the armed roll B² may be of any desired form, tapering and round, as in Fig. 2, or half-ellipsoidal with a flat face, as in Fig. 4. The latter form gives them a raking cut or tear, and may be used in dry corn, where the husks are damp and cling to the ear. H is a table on which the corn is laid (when on the stalks) convenient for the operator. On its front end is a sheet-metal or thin-board hood $h$, as seen in Figs. 1 and 3. In the latter figure a portion is broken away at the front to show the inside. Side boards $h'$ extend from the hood $h$ down below the driving-shaft D², to guide the corn as it descends along the surfaces of the rolls B' and B². These are shown in Figs. 1 and 3 as being held in place by the flat bent braces $i^2$, which latter are screwed upon the outside of the boards $h'$ and their foot ends are secured by bolts upon the top surface of rails $a\ a$.

In Fig. 2 the side boards are shown in dotted lines with the braces omitted. In Fig. 5 rubber rolls B³ and B⁴ are shown. These rolls are substituted for the cast-iron rolls or rollers B' and B², Figs. 2 and 4, when husking green corn for canning purposes, the same initial process of separating the husk by the spirals and eccentrics (shown in Figs. 1, 2, and 3 and in the enlarged views, Fig. 6) being used. It is not entirely essential that the teeth on the eccentrics should extend all the way around, as they will operate where a portion of their surfaces is left without teeth.

In Fig. 8 it will be noticed that an oblong hole $o$ in the serrated plates $d\ d'$, through which they are held to lugs $b^4\ b^4$, renders them adjustable to the faces of the eccentrics C C', the bolts $d^2\ d^2$ securing them in adjustment. In the lower view of Fig. 8 the plate $d'$ is shown broken in part to let the bolt $d^2$ be seen in the hole $o$.

By reference to Figs. 10, 11, 12, and 13, it will be seen that the boxes I and J, which support the journals of shaft $a^4$, are adjustable, the sections I' and I², on which these boxes are cast, being movable and each provided with an oblong hole through which a fastening-bolt $e^2$ and $e^3$ extends and by which the movable section is held to each frame-plate. The object in having the box partly in each section of the frame-plate is to prevent the adjustable shaft from being raised above the plane of the fixed shaft during the operation of adjustment, the oblong hole in the fixed section operating as a guide for the journal at either end and confining the shaft to its proper plane and parallelism in its adjustment. By loosening these screw-bolts the movable sections I' and I² (or either of them)

can be adjusted toward or from the fixed shaft-bearings $k$ and $k'$ of the shaft $a^3$, the movable section or sections being allowed to slide upon the surface of the frame-plate, to which each is fitted for that purpose. The movement is effected by means of the horizontal end screw-bolts $e^4$ and $e^5$, Fig. 2, which pass through the standing lugs $e^6$ and $e^7$, (which latter are in line with the movable sections,) thereby allowing of the adjustment of the right roll $B^2$ at each end of its shaft-bearings. In Figs. 12 and 13 a side flange $f'$ has also an oblong hole in it to allow of the sidewise adjustment of the upper end of shaft $a^4$, and also forms a part of the box I on the plate $a'$.

In operating the machine power is applied by a belt to the main drive-pulley K and transmitted through bevel-gears $a^7$ and $a^8$ to the rollers B' and $B^2$, the toothed eccentrics, and spirals C and C'. The sprocket-and-chain gearing L is also set in motion, the movement of the parts being indicated by the arrows. The stalks of corn are taken from the table H (on which they have been previously laid crosswise) by the operator, who stands in front of the machine, as before stated, and places the ear in the position shown in Fig. 1, with its stem between the spirals C C', the stalk hanging below the latter, and as the ear is seized and carried downwardly it is punched out of the husk and the stalk drops to the ground, while the ear being carried over the eccentrics D and D' is further stripped of its husk, and on its reaching rollers B' and $B^2$ whatever husks or silk remain upon it are pinched off between the latter, this part of the process being aided by the pins $i$ $i$ of roller $B^2$ and the transverse roller F', which by means of its spiral flange $f$ turns the ear over, thus exposing its whole surface to the action of the rollers, which latter have their surfaces in rolling contact at their lower ends.

In husking green corn (for canning purposes) the ears are always first jerked from the stalks, and we simply substitute for rolls B' and $B^2$ the plain rolls $B^3$ and $B^4$. (Seen in Fig. 5.) These are preferably made of rubber, and the pins (seen in rolls B' and $B^2$) are dispensed with, as they would bruise and tear the soft ears.

We claim as our invention—

1. In a corn-husking machine, two slightly-tapering main rolls mounted upon inclined shafts, the latter terminating at their free ends in oppositely-pitched worm-spirals, eccentrics on said shafts having teeth or corrugations thereon, serrated plates coincident with the faces of said eccentrics and operating therewith, and a transverse roller having a spiral flange suspended over said main rolls, substantially as and for the purpose set forth.

2. In a corn-husking machine, the two slightly-tapering main rolls having inclined shafts, tapering worm-spirals on the ends of the latter, corrugated eccentrics on said shafts between said worm-spirals and said main rolls, and serrated plates having their teeth coincident with the faces of said eccentrics, said serrated plates having means for adjustment, as described, in combination with a spiral flanged roller over said main rolls and having its plane of rotation crossing the plane of rotation of the latter.

3. In combination with a pair of inclined rolls having their shafts in the same plane, the devices for seizing the ear and snapping it from the stalk, consisting of the tapering spiral worms, eccentrics having longitudinal teeth or corrugations on their faces, serrated plates coacting with said eccentrics, and a spiral flanged roller having its axial line crossing the axial lines of said inclined rolls, with the means described for supporting said spiral flanged roller over said inclined rolls and for its co-operative adjustment therewith, substantially as and for the purpose hereinbefore set forth.

4. In a corn-husking machine, the two inclined main rolls, the devices for stripping the husk from the ear and separating the latter from the stalk, consisting of the terminal screw-worms and eccentrics on the shafts of said inclined main rolls, and the spiral flanged roller suspended transversely over said main rolls, the means for driving said transverse roller, in connection with the means for driving said main rolls, and the devices described for pivotally suspending said transverse roller over the latter and for bringing it into co-operative adjustment therewith.

5. In a corn-husking machine having its main rolls mounted upon parallel shafts, one of the latter being made adjustable, the combination, with said shafts, said main rolls, and their husking devices, of the frame-plates composed of a fixed and a movable section and having the box of the adjustable shaft partly in each of said sections, with the means described for the adjustment of the latter, substantially as set forth.

6. In a corn-husking machine, the rectangular frame B, the table H, having the hood $h$ on its front end supported over said frame, and the inner frame A supporting the mechanism and consisting of the inclined rails $a\ a$, having their ends connected by a cast-iron frame-plate having a fixed and a movable box thereon, the latter being made adjustable by the means described, for the purpose set forth.

7. The combination, in a corn-husking machine, of a frame-plate having a fixed and a movable box for the shafts of the main rolls and their accessories, means for the adjustment of the movable box, as described, said frame-plate having a rectangularly-extended part, with a box thereon supporting one end of the main driving-shaft, and having a lateral curved arm, with a box thereon supporting said main driving-shaft at or near the point of the greatest deflective strain on the latter, substantially as set forth.

8. The combination, with the main driving-shaft, the transverse roller-shaft, and the gearing connecting them, of the long bracket having a lateral sleeve at each end, one end of said bracket being pivoted upon said main driving-shaft, and the opposite end supporting said transverse roller-shaft, substantially as and for the purpose set forth.

9. In combination with the pivotally-suspended transverse roller, the bracket supporting the latter, and the inner frame, of the long bar-spring having its bent end bolted to the inclined rail $a$ and having its resilient end connected with said bracket by an adjustable screw-bolt, substantially as described, for the purpose set forth.

10. In a corn-husking machine, the combination, with the husking devices used for the initial part of the process, of rubber rolls or rolls having a rubber covering for husking green corn, substantially as set forth.

11. In a corn-husking machine having the two inclined coacting rolls, the combination, with a roll provided with circumferential grooves, of a roll coacting therewith having rows of pins tapering outwardly from the surface of the roll to their ends, said pins being adapted to engage said circumferential grooves, as set forth.

12. In a corn-husking machine, the combination of the devices for loosening the husk from the ear and for forcing the latter toward the rolls at the same time, the eccentrics and serrated plates operating to separate the husks and silk, the coacting inclined rolls forming a slide for the ears, and the transverse roller having a spiral flange operating to turn the ears over as they pass under it and thus allow the inclined rollers to complete the process of removing the husk and silk from the ears, substantially as hereinbefore set forth.

In testimony whereof we affix our signatures in presence of two witnesses.

SAMUEL E. MORRAL.
   JOHN MORRAL.
   WILLIAM W. MORRAL.

Witnesses:
 CONRAD HARTMAN,
 F. M. GRAHAM.